United States Patent [19]
Gerlach

[11] 4,094,193
[45] June 13, 1978

[54] ACOUSTIC SYSTEM FOR MEASURING THE SPEED OF CURRENTS IN A BODY OF WATER

[75] Inventor: Manfred Gerlach, Bremen, Germany
[73] Assignee: Fried. Krupp Gesellschaft mit beschrankter Haftung, Essen, Germany
[21] Appl. No.: 794,660
[22] Filed: May 6, 1977
[30] Foreign Application Priority Data
  Jun. 24, 1976  Germany ............... 2628336
[51] Int. Cl.² ................ G01P 5/00; G01F 1/66
[52] U.S. Cl. ................ 73/170 A; 73/194 A
[58] Field of Search .......... 73/194 A, 170 A
[56] References Cited
  U.S. PATENT DOCUMENTS
  3,555,899  1/1971  Yamamoto et al. ............ 73/194 A
  3,949,605  4/1976  Stallworth et al. ............ 73/194 A FOREIGN PATENT DOCUMENTS
  40,356  3/1966  Japan ............... 73/194 A

*Primary Examiner*—Charles A. Ruehl
*Attorney, Agent, or Firm*—Spencer & Kaye

[57] ABSTRACT

An acoustic system for measuring the speed of flow or current speed of a body of water employing a measuring path through the water which extends from one shore to the other in a direction oblique to the direction of flow of the water. A triggerably measuring sound generator positioned on one shore transmits a pulse over the measuring path to a receiver on the other shore. The receiver produces an output which triggers the measuring sound generator to emit a subsequent pulse. A measuring circuit evaluates the resulting pulse repetition frequency of pulses emitted by the sound generator and produces an output proportional to the flow speed of the water.

9 Claims, 5 Drawing Figures

ACOUSTIC SYSTEM FOR MEASURING THE SPEED OF CURRENTS IN A BODY OF WATER

BACKGROUND OF THE INVENTION

The present invention relates to acoustic systems for measuring the flow speed of a body of water. More particularly, this invention relates to acoustic systems for measuring the flow speed of a body of water by using at least one sound generator which transmits a sonic pulse through the water to a receiver.

It is often necessary to measure the speed of flow or the speed of the current of a body of water over a period of time and at various points along the path of the current. This information is especially useful in evaluating the effects of hydraulic engineering projects.

Thus, German Patent No. 1,076,980 discloses a method of arranging a measuring sound generator and receiver in a flowing medium. The sound generator emits a pulse which is transmitted over a measuring path to the receiver. The receiver is connected by a signal cable to the measuring sound generator. Upon reception of the pulse transmitted from the sound generator, the receiver transmits a response pulse via the signal cable back to the measuring sound generator. The response pulse triggers the sound generator to emit a subsequent pulse. In this patent, the pulse repetition frequency of the sound generator is proportional to the speed of flow of the water. The sound generator and receiver are enclosed in a streamlined housing in order to minimize errors in the readings due to disturbance of the current by the presence of the generator and the receiver. In order to avoid damage by boat and ship traffic, the sound generator and receiver located at opposite sides of the current to be measured are preferably disposed on the banks of the body of water.

A primary disadvantage of this system is that it requires the use of a signal cable, which must extend across the body of water to connect the sound generator to the receiver so that the receiver can transmit a trigger pulse back to the sound generator. Accordingly, such flow measurements have previously been made only in the vicinity of a bridge over which the signal cable could be laid. It is possible, if no bridge is available, to lay the signal cable across the body of water, but the cable must then be buried in the bed of the body of water because a cable placed on top of the bed will soon be damaged by moving sedimentary material borne by the current of the body of water. Moreover, it would be necessary to prohibit anchoring at the location of the cable. The expense of overcoming the problems of laying the signal cable in the bed of the body of water is thus prohibitive.

German Auslegeschrift [Published Application] No. 1,648,147, discloses an arrangement for measuring the flow of liquid in a pipe having parallel walls wherein the measuring sound generator and the receiver are both attached to the same wall of the pipe. With this arrangement the reflections of a pulse from the opposite wall of the pipe are utilized to return the pulse emitted by the measuring sound generated to the receiver. Such an arrangement, however, cannot be used with bodies of water such as rivers having natural shore lines which cannot produce a satisfactory pulse reflection.

In view of the foregoing considerations there is a need for a system which can measure the speed of flow or of the current of a body of water in any desired location along, or in, the body of water without using a cable to connect the measuring sound generator and receiver.

SUMMARY OF THE INVENTION

In view of the deficiencies of the prior art, it is an object of the instant invention to provide a new and improved system for measuring the speed of a fluid current.

It is a further object of the instant invention to provide a new and improved system for measuring the speed of flow of a body of water without hindering traffic along that body of water.

It is a further object of the instant invention to provide a new and improved system for measuring the speed of current of a body of water which can be positioned at substantially any location along the body of water without incurring prohibitive installation expense.

It is still a further object of the instant invention to provide a new and improved system for acoustically measuring the speed of the current of a body of water by transmitting sound pulses through the water, wherein the generator of, and receiver for, the pulses are not connected by an electrical cable which extends through the body of water.

These and other objects are achieved, according to the present invention, in a system for measuring the speed of flow of a body of water by transmitting a measuring pulse from a measuring sound generator to a first receiving transducer over a measuring path through the water which is oblique to the direction of the flow to be measured, by connecting the receiving transducer to energize a responder associated with a further sound generator which transmits a response pulse back through the water over a signal path to a second receiving transducer located at the same shore as the measuring sound generator, and connected to trigger the measuring sound generator, upon receipt of a response pulse, to transmit a subsequent measuring pulse. The repetition rate or frequency of the pulses emitted by the measuring sound generator is then proportional to the flow speed of the body of water.

According to a preferred embodiment of the present invention, the signal path over which the response pulse is transmitted is oriented to also extend obliquely to the current flow direction and transverse to the oblique direction of the measuring path over which the original pulse is transmitted so that the signal path crosses the measuring path, and the transducers are arranged so that the paths cross approximately in mid-stream. The signal path can then be utilized as a second measuring path. To this end, an additional measuring sound generator is disposed at the end of the signal path adjacent to the second receiving transducer and an additional receiver is disposed adjacent to the further sound generator. The first-mentioned measuring path can be used as a second signal path by providing an additional receiver adjacent to the measuring sound generator and by providing an additional sound generator adjacent to the first receiving transducer.

This preferred embodiment of the invention is based on a consideration disclosed in German Auslegeschrift [Published Application] No. 1,648,147 wherein the average value of the flow speed can be measured with an arrangement of crossed measuring paths, this average value being determined on each one of the paths. With this arrangement, errors resulting from deviations of the direction of flow from the axis of the conduit of the liquid cancel one another with the result that the measured flowthrough speed component is always accurate. In implementing the preferred embodiment, triggering of the measuring sound generator is accomplished by a trigger circuit the output of which is connected by a switch with either the measuring sound generator at the measuring path, or with the measuring sound generator at the signal path. The switch also connects the input of the trigger circuit simultaneously with either the response receiver at the signal path or with the response receiver at the measuring path.

The response receiver on the opposite shore includes first and second response generators. The first response generator has its input connected with the receiver at the measuring path and its output connected with the sound generator at the signal path. The second generator has its input connected with the receiver at the signal path and its output connected with the sound generator at the measuring path.

If a ship travelling on the body of water passes the point where the measuring and signal paths cross, no response pulse will arrive at a receiver upon transmission of a pulse from one of the measuring sound generators, since the pulse will be shaded or absorbed by air bubbles caused by the ship's propeller. In order to assure continued operation of the apparatus under such conditions, according to a further feature of the present invention the trigger circuit is connected to a control member which transmits a control signal to the trigger circuit when no response pulse has been received and thus causes the measuring sound generator to be triggered anew.

According to a further embodiment of the invention, the control member is designed to actuate the switch after a given sequence of control pulses. Thereafter, the control member emits a control signal to its trigger circuit.

According to a still further advantageous embodiment of the present invention, only one transducer is provided for a common measuring-signal path on each shore. These transducers are suited for transmitting as well as receiving. In this embodiment only one response generator is connected with a switching device to connect either the transducer at the measuring path, or the transducer at the signal path, with the input of the response generator. The output of the response generator is then connected either with the transducer at the signal path, or with the transducer at the measuring path. In order to operate the switching device, a counter is connected to the input of the response generator to actuate the switching device after a given number of received pulses.

After switching the switching device at the response generator on one shore, no response pulses will be received in response to triggered pulses. The control memory reacts to this absence of pulses by switching the switch and by subsequently emitting a control signal to trigger the trigger circuit, whereupon response pulses are again received. This arrangement permits switching of emitted pulses to the measuring path or to the signal path, respectively, so that the response pulses are received either over the signal path or over the measuring path.

In order to operate the switching device, which is coupled with the response generator, from the shore position of the trigger circuit, a code signal generator is provided. The code signal generator has an output which is connected with the output of the trigger circuit. The code signal generator emits a coded signal through the transducer which is momentarily connected with the output of the trigger circuit. A code signal evaluator is connected with the input of the response generator to actuate the switching device when a code signal is received.

The particular advantages of the systems according to this invention are that the measuring arrangement can be placed at any desired point along the course of a body of water and operates without interfering with the natural flow of the body of water or with navigation on the body of water, since no signal cable connection is required between measuring stations, which may be conveniently positioned on opposite shores. While in the disclosed embodiments the measuring stations are on opposite shores or banks of the body of water, it is within the scope of this invention to position the measuring stations in spaced relation with one another within the body of water to measure the currents or current of a portion of the body of water.

DESCRIPTION OF THE PREFERRED EMBODIMENTS

Figure 1:
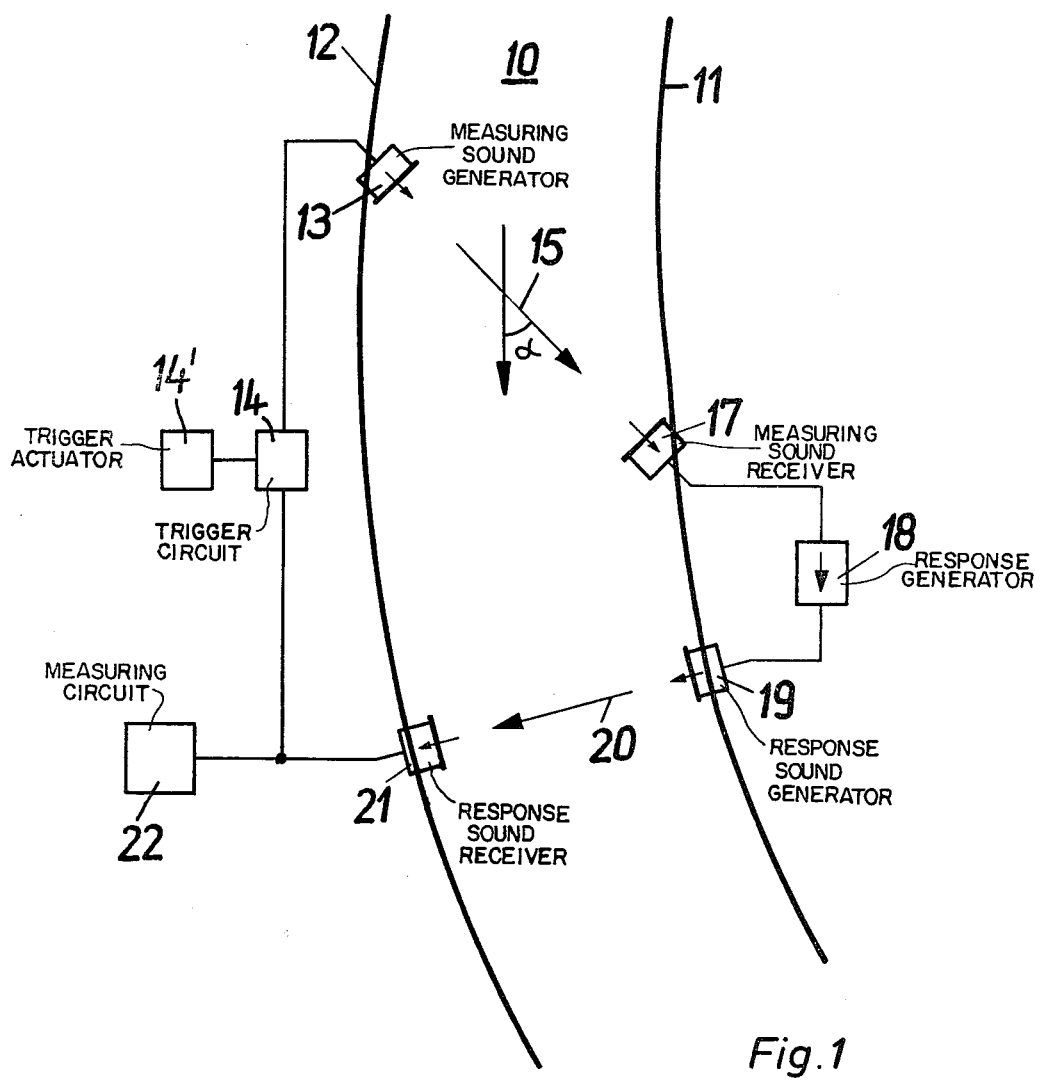
FIG. 1 is a block diagram of a flow measuring system according to the instant invention employing a single measuring path and a single path through the body of water.

Referring now to FIG. 1, the flow speed or current speed of water in a water stream 10 bounded by shore lines, or banks, 11 and 12, is measured by a system including a measuring sound generator 13 disposed on one shore 12 and connected to a trigger circuit 14 which triggers generator 13 to emit pulses over a measuring path 15 through the water in a direction oblique to the direction of current flow. A receiver 17 on the other shore 11 is disposed at the opposite end of the measuring path 15 to receive the pulses emitted by the sound generator 13. The receiver 17 is connected in series with a response generator 18 having an output connected to a further sound generator, or responder, 19. The sound generator 19 emits a response pulse over a signal path 20 through the water to the other shore 12. A response receiver 21 located on shore 12 is disposed to receive the pulses emitted by generator 19 and is connected to the input of the trigger circuit 14. Each time a pulse is received by the response receiver 21, the trigger circuit 14 triggers measuring sound generator 13 to generate a subsequent pulse.

Each of devices 13, 17, 19 and 21 can be completely disposed in a housing submerged in the water, or only the electroacoustic signal transducer portion thereof can be in the respective housing with the remainder of the device disposed on the shore.

Response generator 18 can be constructed according to well-known engineering principles to respond to output signals above a certain threshold from receiver 17 to produce a pulse having the duration and amplitude required to excite generator 19.

The angle α between the river current and the signal path 20 should be nearly 30°.

Operation of the measuring sound generator 13 is initiated in a conventional manner. For example, a circuit 14' connected to the trigger circuit 14 may be manually actuated to apply to the trigger circuit 14 a signal which is similar to the signal generated by the receiver 21. After the measuring sound generator 13 emits the first pulse, it will continue to generate pulses until it is shut off or until pulses transmitted over the paths 15 and 20 are interrupted.

A measuring circuit 22 is connected to the response receiver 21 and evaluates the repetition frequency of pulses received by receiver 21. The repetition frequency of the pulses is directly proportional to the speed of current flow if the measuring path 15 has a component in the direction of the current of the body of water 10. In essence, the repetition frequency of pulses received by the receiver 21 is increased by a factor which is equal to the speed of the current. This is because the length of the measuring path 15 and the length of the signal path 20 are known and therefore the time for an acoustic pulse to traverse the distance of the combined lengths of the measuring path and signal is known. It will be readily seen that this time will be decreased because the components of the current in the direction of the arrow 15 will increase the speed of the pulses between the measuring sound generator 13 and the receiver 17. The change in pulse repetition frequency with current speed is also a function of the angle α between the direction of the path 15 and the direction of the current, which angle is known. Consequently the speed of the current 10 can be trigonometrically determined.

Figure 2:
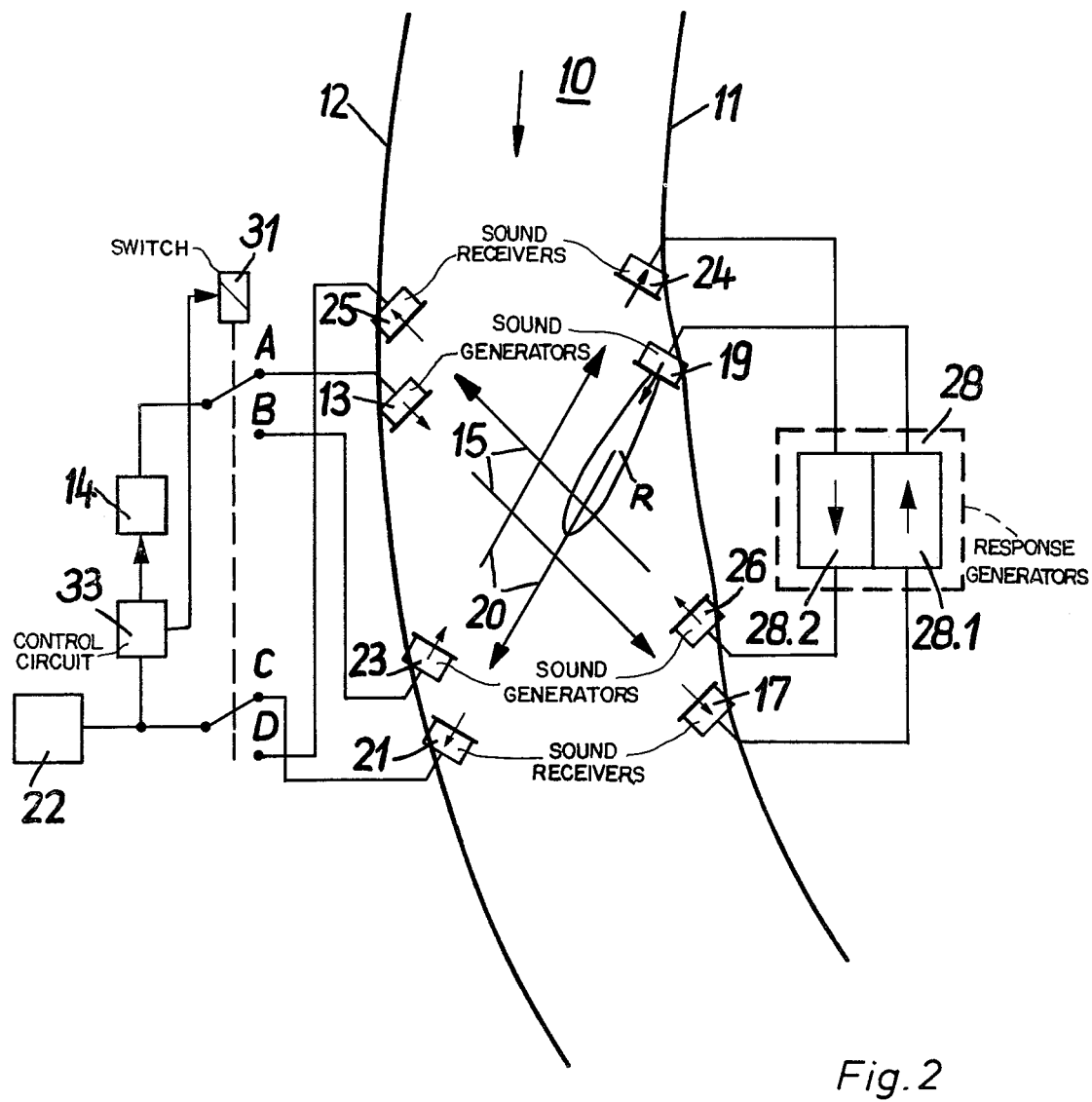
FIG. 2 is a block diagram of a second embodiment of the flow measuring system according to the instant invention employing crossed measuring paths and signal paths in a body of water.

In the embodiment of FIG. 2, the signal path 20 is also oriented obliquely to the direction of current flow but its inclination to the current flow direction is opposite to that of measuring path 15 so that the paths cross in the middle of the stream. With this arrangement, the signal path 20 can serve as a second measuring path by disposition of an additional measuring sound generator 23 adjacent to the response receiver 21 on shore 12 at one end of the path 20 and disposition of an additional receiver 24 adjacent to the sound generator 19 on shore 11 at the other end of path 20.

While the signal path 20 serves as a second measuring path, the measuring path 15 serves as a second signal path. This is accomplished by providing an additional response receiver 25 adjacent to the measuring sound generator 13 on shore 12 at one end of path 15 and an additional sound generator 26 adjacent to the receiver 17 at the other end of path 15 on shore 11.

The trigger circuit 14 is coupled to switching contacts A, B, C and D of a switch 31 so that the output of trigger circuit 14 can be connected by the contact A to the measuring sound generator 13 and by the contact B to the measuring sound generator 23. The input of the trigger circuit 14 is connected by the contact C with the response receiver 21 and by the contact D with the response receiver 25.

A response generator 28 on shore 11 is divided into two response generators 28.1 and 28.2. The first response generator 28.1 has its input connected with the receiver 17 at the end of the measuring path 15 and its output connected with the sound generator 19 at the end of the signal path 20. The other response generator 28.2 has its input connected with the receiver 24 at the end of signal path 20 and its output connected with the sound generator 26 at the end of the measuring path 15.

With the arrangement of FIG. 2 it is possible, by actuation of the switch 31, to cause a measuring pulse to emanate either from the measuring sound generator 13 to measuring path 15, or from the measuring sound generator 23 to measuring path 20. Accordingly, the pulse is transmitted either with or against the direction of the current of the body of water 10. If the measuring sound generator 13 is transmitting the pulse, the response generator 28.1 will produce a response pulse, whereas if the measuring generator 23 is transmitting, the generator 28.2 will produce a response pulse.

When there is no response pulse because of interference caused by, for example, a passing ship, the trigger circuit 14 functions anyway. This is because the trigger circuit is connected in series with a control circuit 33 which emits a control signal to trigger circuit 14 when there is no response pulse, thereby compensating for the absence of a response pulse and re-instituting the triggering sequence.

The measuring sound generators 13 and 23 and the response sound generators 19 and 26 have narrow directional characteristics R, as shown for generator 19. This assures that the initial pulses from generators 13 and 23 can reach only receivers 17 and 24, respectively, and that response pulses can reach only response receivers 21 and 25.

After each switching of switch 31 at least ten pulses should be transmitted.

Figure 3:
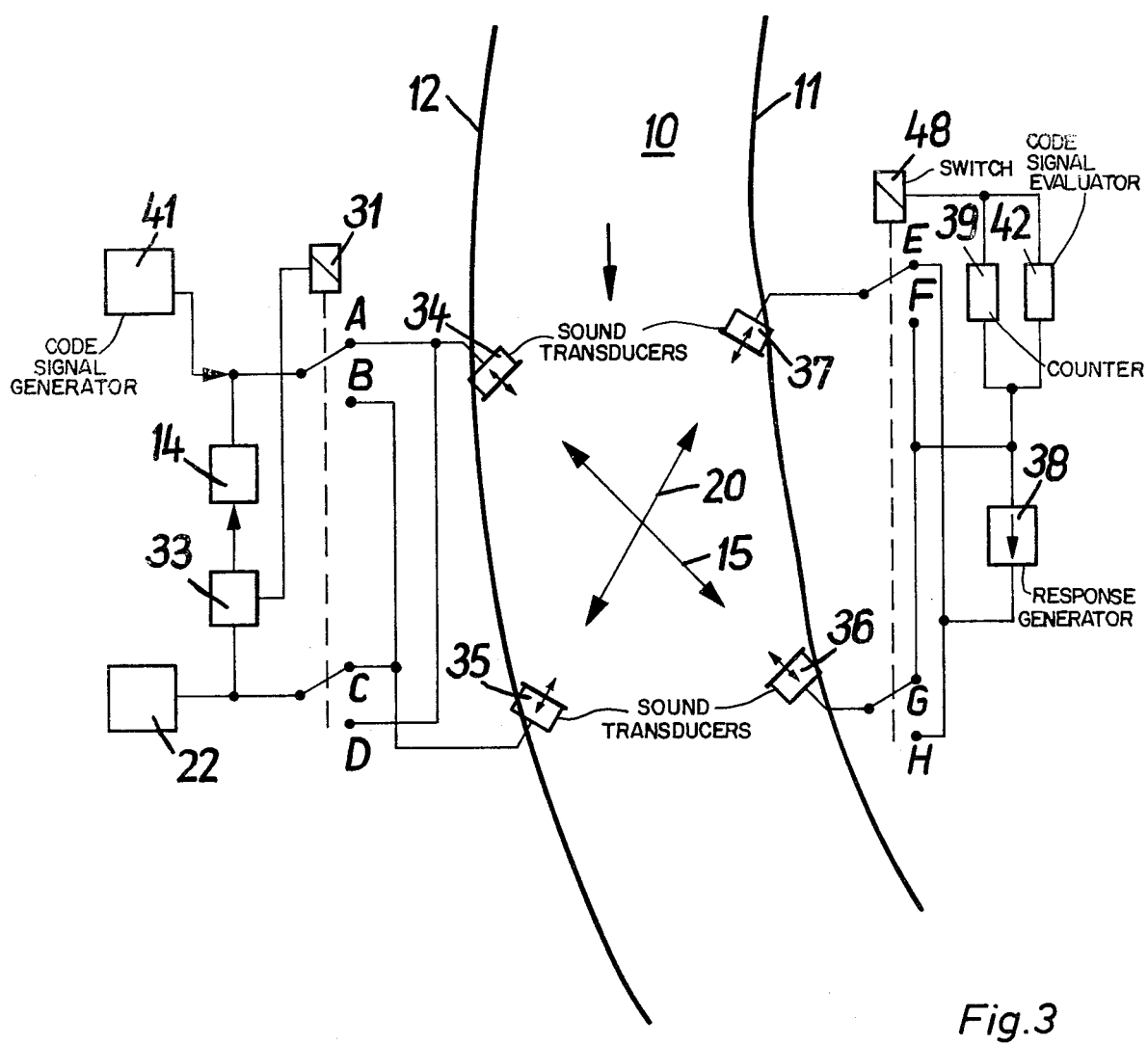
FIG. 3 is a block diagram of a third embodiment of the instant invention similar to that of FIG. 2 but employing only two transducers for each path direction.

A third embodiment using a relatively simple transducer system on both shores 12 and 11 is shown in FIG. 3. These transducers are suited for transmitting as well as receiving. Upstream and downstream transducers 34 and 35, respectively, are located on shore 12 while downstream and upstream transducers 36 and 37, respectively, are located on shore 11. The measuring path 15 extends between the transducers 34 and 36 while the signal path 20 extends between the transducers 35 and 37.

A single response generator 38 is connected with a switch device 48 which switches the output of the response generator 38 to the transducer 37 via contact E or to the transducer 36 via contact H. The input of the response generator 38 can be connected to the transducer 36 via contact G or to the transducer 37 via contact F.

In order to operate the switching device in a manner to correctly connect response generator 38, a counter 39 is connected to the input of the response generator 38. After a given sequence of received pulses, the counter 39 actuates the switching device 48.

Upon switching the switching the switching device 48 on shore 11 from the illustrated position, where the contacts E and G are closed and contacts F and H are open, to the position where contacts F and G are open while F an H are closed, while the contacts of switch 31 remain in the position shown in FIG. 3, no further response pulse will be produced since generator 34 is still producing the triggered pulses. The control member 33 on shore 12 reacts to this absence by actuating the switch 31 on the shore 12 and subsequently emitting a control signal to the trigger circuit 14, whereupon response pulses are again received. This arrangement permits switching of the system back and forth so as to interchange the measuring path 15 with the signal path 20 so that the measuring path assumes the signal path function while the signal path assumes the measuring path function.

In order to be able to operate the switching device 48 from shore 12 with the triggering circuit 14, a code signal generator 41 is provided on shore 12 having an output which is connected to the output of trigger circuit 14. The code signal generator 41 emits a coded signal via whichever of the transducers 34 or 35 is at that moment connected with the output of the trigger circuit 14. A code signal evaluator 42 connected to the input of the response generator 38 serves to actuate the switching device 48 when a code signal has been received by either of the transducers 36 or 37. The control member 33 reacts to switching by the switch device 48 in the aforedescribed manner.

An embodiment of the evaluation circuit 22 is described for instance in the U.S. Pat. No. 3,914,998 by James L. Mc Shane, patented Oct. 28, 1975.

Figure 4:
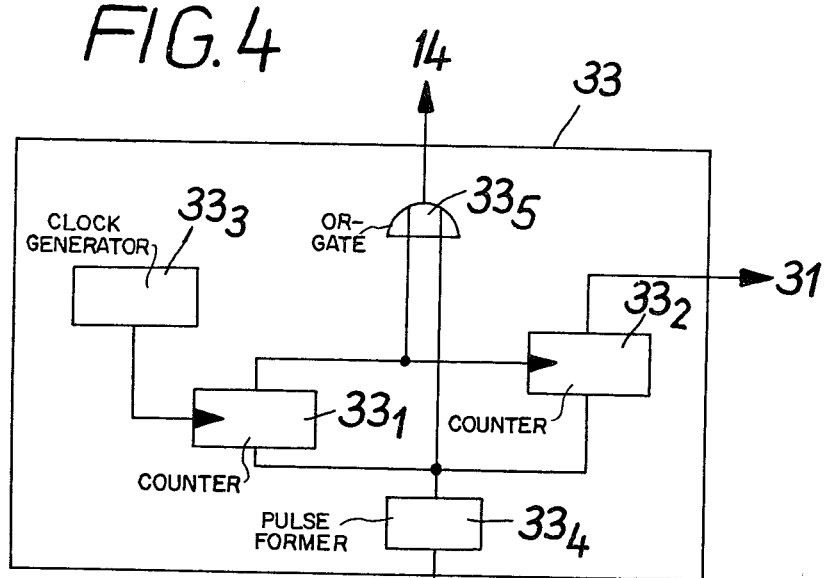
FIG. 4 is a block diagram of a control circuit according to the block diagrams of FIG. 2 and 3.

The control circuit 33 comprises a first counter $33_1$ and a second counter $33_2$ as shown in FIG. 4. The clock input of the first counter $33_1$ is connected with a clock generator $33_3$. The clear inputs of the counter $33_1$ and $33_2$ are connected to an output of a pulse former $33_4$ changing pulses at the input of the control circuit 33 into rectangular pulses. The output of the first counter $33_1$ is connected with the clock input of the second counter $33_2$ and also with a first input of an or-gate $33_5$. A second input of the or-gate $33_5$ is connected to the pulse former $33_4$. The output of the or-gate $33_5$ triggers the trigger circuit 14. The output of the second counter $33_2$ is connected to the switch 31.

Figure 5:
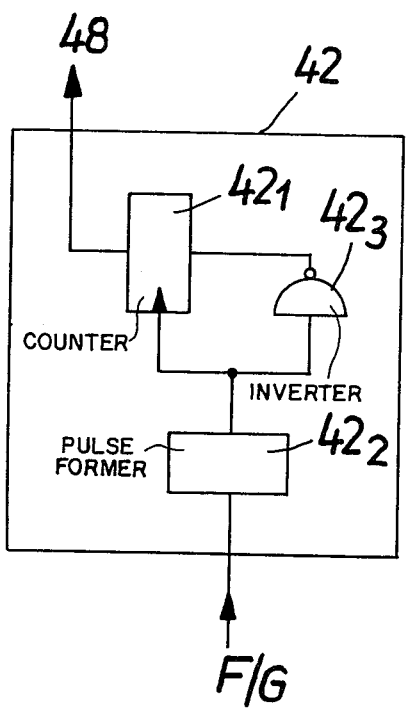
FIG. 5 is a block diagram of a code signal evaluator according to the block diagram of FIG. 3.

If the measuring path 15 is to be interchanged with the signal path 20 a code signal must be transmitted. The code signal at the output of the code signal generator 41 has a pulse length which is longer —for instance ten times — than the length of the pulses for measuring the speed of currents. The code signal evaluator 42 at the shore 11 which receives the code signal comprises, as shown in FIG. 5, a pulse forming circuit $42_2$, a counter $42_1$ and an inverter $42_3$. The clear input of the counter $42_1$ is connected with the output of the inverter $42_3$. The signal at the output of the counter $42_1$ appears only if the long pulse of the code signal is received, otherwise the counter $42_1$ is cleared by the output signal from inverter $42_3$ before reaching its full contents. This signal sets the switch 48.

In FIGS. 1, 2 and 3, the various transducers, which are also specifically referred to as sound generators and receivers, and associated circuitry are shown positioned on opposite shores 11 and 12 of the body of water 10. If necessary, if desired, the transducers could be disposed in the body of water in spaced relation to both one another and the shores in order to monitor a selected portion of the body of water.

It will be understood that the above description of the present invention is susceptible to various modifications, changes and adaptations, and the same are intended to be comprehended within the meaning and range of equivalents of the appended claims.

What is claimed is:

1. In a system for measuring the speed of flow of a current in a body of water, which system includes a first electroacoustic transducer disposed in the body of water along one side of the current and a second electroacoustic transducer disposed in the body of water along the opposite side of the current, each transducer having an electrical signal terminal and presenting a directional acoustic signal radiation pattern, the transducers being located at respectively opposite ends of a first path extending through the water, across the current and oblique to the direction of current flow and each transducer being oriented so that the axis of its radiation pattern extends along the first path toward the other transducer, the improvement comprising: a third electroacoustic transducer disposed in the body of water along the opposite side of the current and a fourth electroacoustic transducer disposed in the body of water along the one side of the current, each of said third and fourth transducers having an electrical signal terminal and presenting a directional acoustic signal radiation pattern, and each of said third and fourth transducers being located at respectively opposite ends of a second path extending through the water and across the current and being oriented so that the axis of its radiation pattern extends along the second path toward the other one of said third and fourth transducers; response generator means located at the opposite side of the current and having an input and an output and arranged to produce an electrical response pulse at its output upon appearance of an electrical signal pulse at its input; first connecting means connecting the input of said response generator means to the electrical signal terminal of one of said second and third transducers and connecting the output of said response generator means to the electrical signal terminal of the other one of said second and third transducers for causing receipt of an acoustic pulse by said one of said second and third transducers to result in the emission of an acoustic pulse into the water by said other one of said second and third transducers; trigger circuit means located at one side of the current and having an input and an output and arranged to produce an electrical trigger pulse at its output upon appearance of an electrical signal pulse at its input; second connecting means connecting the input of said trigger circuit means to the electrical signal terminal of one of said first and fourth transducers and connecting the output of said trigger circuit means to the electrical signal terminal of the other one of said first and fourth transducers for causing receipt of an acoustic pulse by said one of said first and fourth transducers to result in the emission of an acoustic pulse into the water by said other one of said first and fourth transducers, said other one of said first and fourth transducers and said one of said second and third transducers being located at respectively opposite ends of one of said paths, while said one of said first and fourth transducers and said other one of said second and third transducers being located at respectively opposite ends of the other one of said paths, whereby the other one of said first and fourth transducers constitutes a first measuring sound generator for emitting an acoustic pulse into the water along its respective path in response to each electrical trigger pulse applied to its signal terminal from the outpt of said trigger circuit means, said one of said second and third transducers constitutes a first measuring sound receiver for applying an electrical signal pulse to the input of said response generator means in response to each acoustic pulse incident thereon, said other one of said second and third tranducers constitutes a first response sound generator for emitting an acoustic response pulse into the water in response to each electrical response pulse applied to its signal terminal from the output of said response generator means, and said one of said first and fourth transducers constitutes a first response sound receiver for applying an electrical signal pulse to the input of said trigger circuit means in response to each acoustic pulse incident thereon; and means connected in said system for evaluating the repetition rate at which acoustic pulses are produced by said first measuring sound generator to provide an indication of the current flow speed.

2. An arrangement as defined in claim 1 wherein said third and fourth transducers are so located relative to one another that said second path extends in a direction which is oblique to the direction of the current and which is opposite to the direction of said first path relative to the current flow direction, said first and second paths crossing at a point within the current; said system furter comprises means defining a second measuring sound generator disposed adjacent said first response sound receiver for emitting acoustic measuring pulses into the water along the path associated with said first measuring sound generator in response to electrical trigger pulses, means defining a second measuring sound receiver disposed adjacent said first response sound generator for producing electrical signal pulses in response to acoustic pulses incident thereon, means defining a second response sound generator disposed adjacent said first measuring sound receiver for emitting acoustic pulses along the path associated with said first measuring sound receiver and means defining a second response sound receiver disposed adjacent said first measuring sound generator for producing electrical signal pulses in response to acoustic pulses incident thereon; said response generator means has a second input connected to said second measuring sound receiver and a second output connected to said second response sound generator for supplying to said second response sound generator an electrical signal causing said second response sound generator to emit an acoustic pulse upon production of each electrical signal pulse by said second measuring sound receiver; said second connecting means comprise switch means switchable between a first position in which said trigger circuit means input is connected to said first response sound receiver and said trigger circuit means output is connected to said first measuring sound generator and a second position in which said trigger circuit means input is connected to said second response sound receiver and said trigger circuit means output is connected to said second measuring sound generator for causing said trigger circuit to supply an electrical trigger pulse to said second measuring sound generator upon production of each electrical signal pulse by said second response sound receiver; and said means for evaluating are connected for evaluating the repetition rate at which measuring pulses are produced at both positions of said switch means.

3. An arrangement as defined in claim 2 further comprising a control member connected to said trigger circuit means for emitting a control signal to cause said trigger circuit means to supply an electrical trigger pulse at its output when no electrical signal pulse has been applied to its input for a predetermined time period.

4. An arrangement as defined in claim 3 wherein said control member is connected to said switch means for effecting switching between its said positions after a given sequence of electrical signal pulses has been applied to the input of said trigger circuit means, and for emitting a control signal after each such switching operation.

5. An arrangement as defined in claim 1 wherein said second connecting means are arranged to selectively connect the electrical signal terminals of each of said first and fourth transducers to either one of the input and output of said trigger circuit means, each of said first and fourth transducers being connected, at any one time, to a respectively different one of the input and output of said trigger circuit means, and said first connecting means comprise switch means connected between said response generator means and said second and third transducers and switchable between two states for selectively connecting the electrical signal terminals of each of said second and third transducers to either one of the input and output of said response generator means, each of said second and third transducers being connected, at any one time, to a respectively different one of the input and output of said response generator means.

6. An arrangement as defined in claim 5 further comprising counter means connected between said response generator means and said switch means for counting the pulses delivered to said response generator means and switching said switch means between its states after counting a predetermined number of pulses.

7. An arrangement as defined in claim 5 further comprising: a code signal generator connected to the output of said trigger circuit means for producing a code signal and applying such code signal as an input signal to the electrical signal terminal of that one of said first and fourth transducers currently connected to the output of said trigger circuit means for causing that one of said first and fourth transducers to emit an acoustic signal corresponding to the code signal; and a code signal evaluator connected to said response generator means for switching said switch means upon receipt of the acoustic signal corresponding to the code signal by that one of said second and third transducers currently connected to the input of said response generator means.

8. An arrangement as defined in claim 5 further comprising a control member connected to said trigger circuit means for emitting a control signal to cause an electrical trigger pulse to appear at the output of said trigger circuit means when no electrical signal pulse has been applied to the input of said trigger circuit means for a predetermined time period.

9. An arrangement as defined in claim 8 wherein said control member is connected to said second connecting means for interchanging the connections of the input and output of said trigger circuit means with said first and fourth transducers after a given sequence of electrical signal pulses has been applied to the input of said trigger circuit means, and for emitting a control signal after each such connection interchange.

* * * * *